May 25, 1926.  
G. H. HANDLEY  
ATTACHMENT FOR AUTOMOBILES  
Filed March 9, 1925
1,586,428
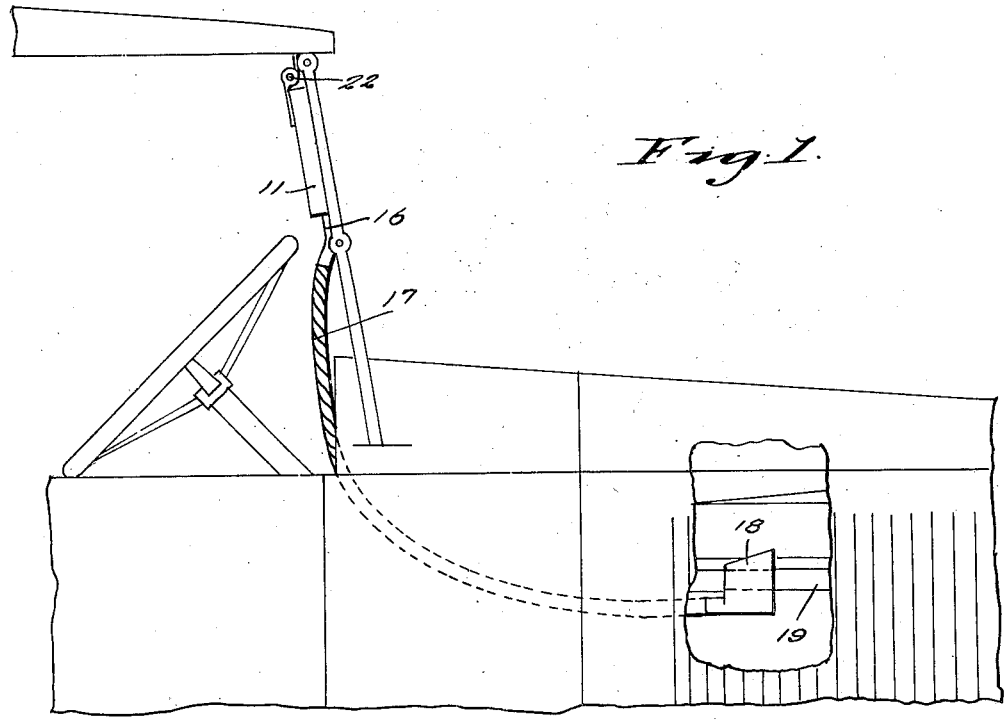
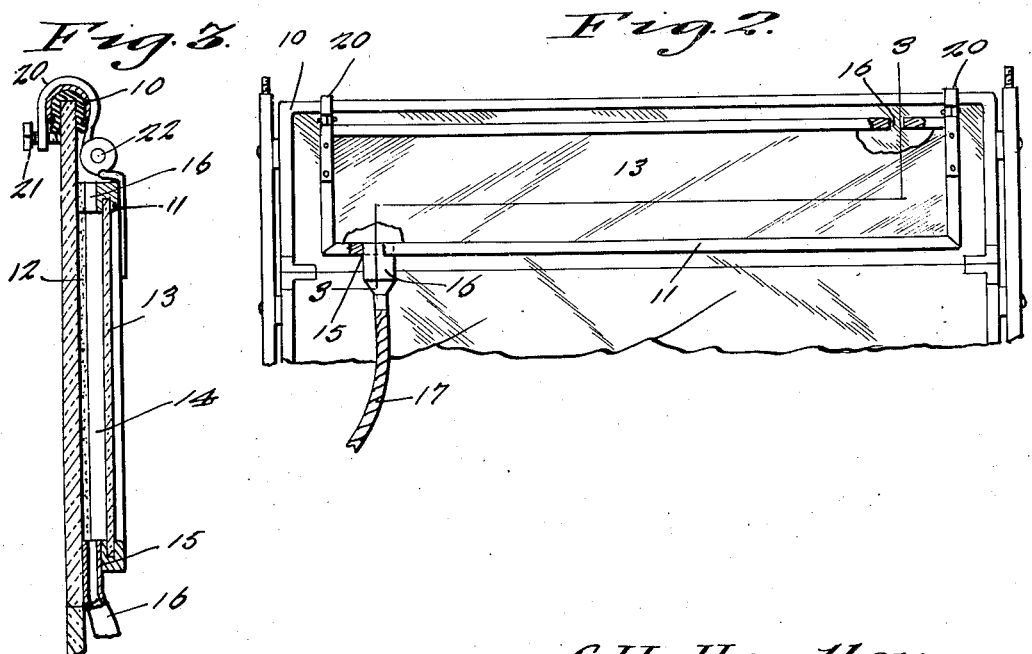
G. H. Handley, INVENTOR  
BY Victor J. Evans, ATTORNEY
WITNESS Patented May 25, 1926.

1,586,428

UNITED STATES PATENT OFFICE.

GEORGE H. HANDLEY, OF OGDENSBURG, NEW YORK.

ATTACHMENT FOR AUTOMOBILES.

Application filed March 9, 1925. Serial No. 14,182.

This invention relates to attachments for automobiles and has for an object the provision of means which may be secured to the windshield of an automobile to provide an air space for the reception of heated air, whereby the latter may be distributed over the surface of the windshield to heat the same and prevent the accumulation of moisture.

Another object of the invention is the provision of a device for the above purpose which is mounted in a manner to permit of its being conveniently moved into and out of position so as to be at all times ready for use.

With the above and other objects in view, the invention further includes the following novel features and details of construction, to be hereinafter more fully described, illustrated in the accompanying drawings and pointed out in the appended claim.

In the drawings:—

Figure 1 is a fragmentary side elevation partly broken away illustrating the invention applied to an automobile.

Figure 2 is a fragmentary elevation looking at the inside of an automobile windshield.

Figure 3 is an enlarged section taken substantially on the line 3—3 of Figure 2.

Referring to the drawings in detail wherein like characters of reference denote corresponding parts, the reference character 10 indicates a portion of the frame of an automobile windshield to which the invention is applied. The invention comprises a substantially rectangular frame 11 which may be of any suitable size but which preferably is of a size which when positioned for use will be in the normal line of vision of the driver of the automobile. The frame 11 is provided along one face with a compressible pad or strip 12, the latter being adapted to engage the adjacent face of the windshield so as to provide a substantially airtight joint between the frame and shield. The frame is provided with a glass or other transparent panel 13 which is spaced from the windshield and when the device is in position for use cooperates with the windshield to form an air space 14. The frame is provided with an inlet opening 15 and an outlet opening 16, the said openings being preferably located at opposite ends of the frame as illustrated in Figure 2 of the drawings. The inlet opening 15 and the outlet opening 16 are in the form of recesses formed on one face of the frame 11, that is, the face which engages the inner face of the windshield, the compressible pad or strip 12 being between this face and the inner face of the windshield.

Extending into the opening 15 is one end of a nozzle 16ª, the latter being carried at one end of a flexible pipe or hose 17 which extends beneath the hood of the automobile. The inner end (the end beneath the hood) of the hose 17 is provided with a funnel-like member 18. This member 18 is secured in any suitable manner upon the exhaust manifold 19 of the engine and is open at its forward end so as to receive and permit a current of air to pass through the hose 17. This air is heated from the exhaust manifold 19 and passes in a heated state to the air space 14, circulating through this air space and passing out through the outlet 16. The windshield may thus be kept sufficiently warm to prevent the accumulation of snow or other moisture thereon so that the vision of the driver will not be obscured.

Any suitable means may be provided for securing the device in place, but it is preferable to provide hook-shaped attaching brackets 20 which are removably secured over the windshield frame 10 by set screws 21 and which are hingedly connected to the frame 11 as shown at 22. By this means the device may be normally positioned above the line of vision of the driver, or may be quickly swung into position for use as shown in the drawings.

The invention is susceptible of various changes in its form, proportions and minor details of construction and the right is herein reserved to make such changes as properly fall within the scope of the appended claim.

Having described the invention what is claimed is:—

The combination with a windshield of an automobile including a frame and a transverse transparent wall in said frame, of a second frame provided with a transparent wall therein, one face of the upper and lower portions of the margin of the second frame having recesses, the face of the second frame having the recesses being adjacent to the inner face of the first transparent wall including a compressible pad between said faces, whereby the recesses may define inlet and outlet openings, brackets engaging over the upper part of the windshield frame and having set screws to secure the brackets in place, the brackets being in turn hingedly connected to the second frame, and means for conducting heated air to and through the inlet opening and into a space between the two transparent walls.

In testimony whereof I affix my signature.

GEORGE H. HANDLEY.